United States Patent [19]
Campagnolo

[11] Patent Number: 5,893,574
[45] Date of Patent: Apr. 13, 1999

[54] BICYCLE STEERING ASSEMBLY

[75] Inventor: Valentino Campagnolo, Vicenza, Italy

[73] Assignee: Campagnolo S.r.l., Vicenza, Italy

[21] Appl. No.: 08/742,059

[22] Filed: Oct. 31, 1996

[30] Foreign Application Priority Data

Oct. 31, 1995 [IT] Italy ................... TO95A0871

[51] Int. Cl.[6] ........................... B62K 21/06
[52] U.S. Cl. ........................... 280/279; 384/517
[58] Field of Search ............... 74/551.9; 384/517, 384/514, 538; 280/279; 403/371, 368, 367

[56] References Cited

U.S. PATENT DOCUMENTS

| | | |
|---|---|---|
| 3,917,425 | 11/1975 | Allaben, Jr. ............... 403/371 |
| 5,246,296 | 9/1993 | Chi ........................... 384/540 |
| 5,330,220 | 7/1994 | Nagano ..................... 280/279 |
| 5,544,905 | 8/1996 | Chen ......................... 280/279 |
| 5,573,262 | 11/1996 | Chi ........................... 280/279 |
| 5,647,684 | 7/1997 | Chen ......................... 403/370 |

*Primary Examiner*—Robert J. Oberleitner
*Assistant Examiner*—Avraham H. Lerner
*Attorney, Agent, or Firm*—Sughrue, Mion, Zinn, Macpeak & Seas, PLLC

[57] ABSTRACT

A bearing assembly for a bicycle comprises a bearing with a first race rigidly connected to the head tube and a second race provided with a neck portion which can be elastically clamped around the steering tube of the bicycle fork.

4 Claims, 1 Drawing Sheet

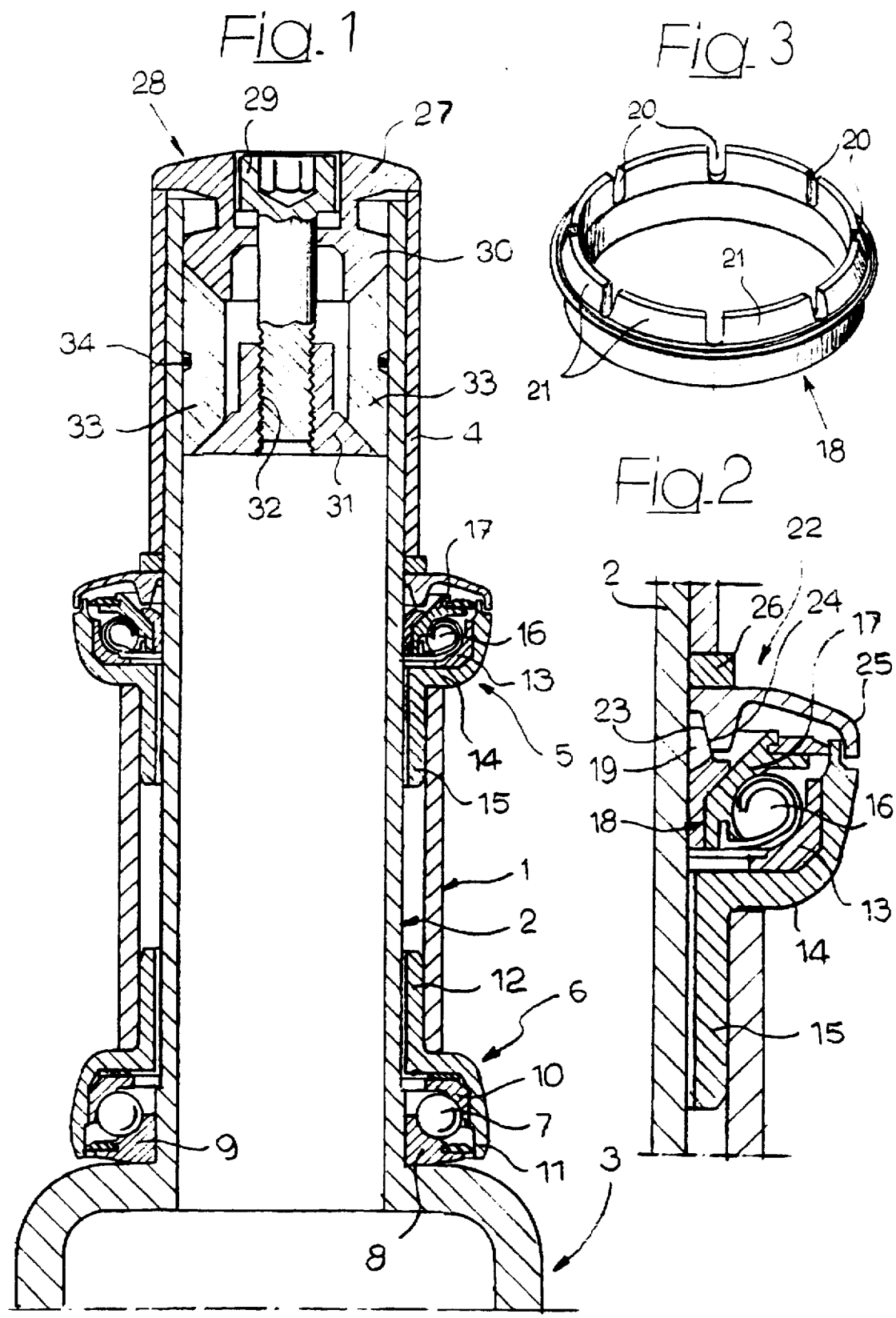

BICYCLE STEERING ASSEMBLY

BACKGROUND OF THE INVENTION

The present invention relates to bicycle steering assemblies of the known type comprising:

a head tube forming part of a bicycle frame, a steering tube which is for connecting the front fork of the bicycle to the bicycle handlebar, a bearing assembly for rotatably supporting said steering tube within said head tube, wherein said steering tube has a smooth, i.e. non threaded, outer surface, and in which said bearing assembly includes:

a first race rigidly connected to said head tube, a second race mounted on said steering tube, and a locking ring for pushing axially said second race towards the first race and for rigidly connecting said second race to the steering tube.

A steering assembly of the above indicated type is for example disclosed in European Patent EP-B-0 479 138. In this known solution, said second race of the bearing assembly is mounted with clearance above the steering tube to enable said locking ring to be interposed between the steering tube and the second race for rigidly connecting the latter to the steering tube. To this end, the locking ring has an outer conical surface able to engage a corresponding conical inner surface of the second race, so that the locking ring is forced between the steering tube and the second race causing the latter to be locked on the steering tube.

SUMMARY OF THE INVENTION

The object of the present invention is that of providing a steering assembly of the above indicated type which keeps the advantages of the above described known solution, i.e. the elimination of the outer threading on the steering tube which is instead present in the most conventional solutions, while improving simplicity and locking safety of the device.

In order to achieve this object, the invention provides a steering assemble having all the features which have been indicated at the beginning and further characterized in that said second race is provided with a neck portion surrounding the steering tube which can be elastically clamped on the latter and in the said locking ring has an inner conical surface able to be pressed axially above a corresponding outer conical surface of said neck portion to complete clamping of the neck portion on the steering tube with the resulting rigid connection of the second race to the steering tube.

Although theoretically said neck portion can be made in one piece with said second race, in a preferred embodiment of the invention the neck portion is constituted by an end portion having an outer conical surface of a bush which is separated from the second race and rigidly connected thereto, said end portion having a plurality of longitudinal slots which define longitudinal tabs which are elastically deflectable, in order to be clamped on the steering tube as a result of the engagement of the locking ring on said neck portion. Preferably said bush is constituted by a one-piece body of plastic material.

Also in said preferred embodiment, said first race is rigidly fixed within a cup-shaped housing body having a tubular tail fixed within the head tube and the locking ring is provided with a protective circumferential skirt which covers the upper portion of said cup-shaped body, in order to protect the various parts of the bearing from dust and foreign bodies.

The means for locking axially said locking ring includes, in a way known per se, a spacer tube slidably mounted around the steering tube (which forms part of a structure for connection to the handlebar) and is interposed axially between the locking ring and the head of a stop element fixed to the top of the steering tube. According to the invention, said stop element is constituted by an expandable device which can be locked within the steering tube by means of a screw.

The steering assembly according to the invention is characterized by a relative simplicity while it ensures a perfect locking of the assembly in the mounted condition.

BRIEF DESCRIPTION OF THE DRAWINGS

Further features and advantages of the invention will become apparent from the description which follows with reference to the annexed drawings, given purely by way of non-limiting example, in which:

FIG. 1 is a longitudinal cross-sectional view of a steering assembly according to the invention, FIG. 2 is a view at an enlarged scale of a detail of FIG. 1, and FIG. 3 is a perspective view of a detail of FIG. 2.

DETAILED DESCRIPTION OF THE INVENTION

With reference to FIG. 1, by 1 there is designated a head tube, forming part of the frame of a bicycle, within which there is rotatably mounted a steering tube 2 connected at its lower end to a front fork 3 of a bicycle, and at its upper end to a tubular portion 4 forming part of a support structure for the bicycle handlebar.

The steering tube 2 is rotatably mounted within the head tube 1 by means of an upper axial-radial bearing 5 and a lower bearing 6 which is also of the axial-radial type. The steering tube 2 has a smooth outer surface without threadings.

The lower bearing 6 includes balls 7 interposed between a first race 8 forced over the steering tube 2 and axially abutting against surface 9, and a second race 10 forced within a housing body 11, for example of light alloy, with an overturned cup-like shape, and a tubular tail 12 which is forced within the head tube 1.

The upper bearing 5, similarly, has a first race 13 forced within a housing body 14 of light alloy, with cup-like shape, having a tubular tail 15 forced within the head tube 1. The bearing 5 comprises balls 16 interposed between the first race 13 and a second race 17.

In the preferred embodiment which is shown in the annexed drawings (see FIG. 2), within second race 17 there is forced a portion of a bush of plastic material 18 (see also FIG. 3) having an end portion 19 constituting a neck portion surrounding the steering tube 2. The end portion 19 has a plurality of longitudinal slots 20 extending from the end edge of bush 18, so as to define a plurality of longitudinal tabs 21 which are elastically deflectable so as to be able to be clamped over steering tube 2 in order to rigidly connect the second race 17 to the steering tube 2. In order to provide complete locking, there is provided a locking ring 22 having an inner conical surface 23 able to engage a corresponding outer conical surface 24 formed on the end portion defining the longitudinal tabs 21 of bush 18. The locking ring 22 is further provided with a peripheral skirt 25 which covers the upper portion of the cup-shaped body 14 in order to protect the parts of the bearing from the outer environment.

The locking ring 22 can be axially clamped by means of tube 4 which is axially slidably mounted around steering tube 2 and is axially interposed between a ring 26 resting above locking ring 22 and the head 27 of an expandable device 28 which can be locked by means of a screw 29 within the steering tube 2.

Purely by way of example, an expandable device 28 is illustrated herein which is of the type comprising two end elements 30, 31 which can be moved axially towards each other by means of said screw 29 which has its head resting above element 30 and its threaded portion screwed within a threaded hole 32 of element 31. Elements 30, 31 have facing conical surfaces between which there are interposed three sectors 33 of plastic material (two of which are visible in FIG. 1) held together by a split elastic ring 34, which on their turn have conical surfaces engaging the conical surfaces of elements 30, 31. The axial movement of elements 30, 31 towards each other causes a radial outward displacement of the three sectors 33 which are compressed against the inner wall of steering tube 2 so as to be locked within said steering tube. Naturally, however, any other stop element can be used as an alternative to that described above purely by way of example. For instance, the upper end portion of the steering tube 2 can be internally threaded, and head 27 can be connected to a threaded bush screwed within the steering tube.

As clearly apparent from the foregoing description, the device according to the invention is relatively simple and constituted by a reduced number of parts. At the same time, the arrangement of a neck portion 19 rigidly connected to the second race 17 which can be clamped around the steering tube 2 enables a safe connection of the assembly to the steering tube to be obtained. Naturally, although the described example has a bush 18 of plastic material which is separated with respect to the second race 17 and rigidly connected thereto, nothing prevents, theoretically, from providing a neck portion 19 in one piece with the second race 17.

Naturally, moreover, while the principle of the invention remains the same, the details of construction and the embodiments may widely vary with respect to what has been described and illustrated purely by way of example, without departing from the scope of the present invention.

What is claimed is:

1. A steering assembly for a bicycle comprising:
   a head tube formating part of a bicycle frame,
   a steering tube for connecting the front fork of the bicycle to the bicycle handlebar,
   a bearing assemble for rotatably supporting said steering tube within said head tube,
   wherein said steering tube has an outer smooth surface, and
   wherein said bearing assembly includes:
      a first race rigidly connected to said head tube,
      a second race mounted on said steering tube, and
      a locking ring for pushing the second race axially towards the first race and for rigidly connecting the second race to the steering tube,
      wherein said second race is provided with an inner bush rigidly connected thereto and surrounding the steering tube, said locking ring having an inner conical surface for engagement with said bush, said bush having an end portion with an outer conical surface which extends above said second race for engagement by said inner conical surface of said locking ring, and
      said end portion having a plurality of longitudinal slots which define longitudinal tabs which are elastically deflectable in order to be clamped on the steering tube and firmly secured thereto as a result of engagement of the locking ring over the tabs of said end portion.

2. Steering assembly according to claim 1, wherein said bush has a one-piece body of plastic material.

3. Steering assembly according to claim 1, wherein said first race is rigidly fixed within a cup-shaped body having a tubular tail fixed within said head tube, said locking ring being provided with a circumferential protective skirt which covers the upper portion of said cup-shaped body.

4. Steering assembly according to claim 1, wherein there are provided means for axially locking the locking ring, including a spacer tube slidably mounted around the steering tube and axially interposed between the locking ring and the head of a stop element fixed to the top of the steering tube, wherein said stop element is constituted by an expandable device, which can be locked within the steering tube by means of a screw.

* * * * *